(12) United States Patent
Sai et al.

(10) Patent No.: US 7,515,760 B2
(45) Date of Patent: Apr. 7, 2009

(54) MULTIPLE PICTURE-DATA COMPRESSION SYSTEM

(75) Inventors: Hirotomo Sai, Yokohama (JP); Daisuke Yoshida, Yokohama (JP); Tadasu Horiuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 658 days.

(21) Appl. No.: 11/138,282

(22) Filed: May 27, 2005

(65) Prior Publication Data

US 2006/0093229 A1    May 4, 2006

(30) Foreign Application Priority Data

Oct. 6, 2004    (JP)    ............... 2004-293190

(51) Int. Cl.
*G06K 9/36*    (2006.01)

(52) U.S. Cl. ........................................ 382/238
(58) Field of Classification Search ................. 382/238
See application file for complete search history.

(56) References Cited

U.S. PATENT DOCUMENTS 5,625,410 A * 4/1997 Washino et al. ............ 348/154
5,724,475 A * 3/1998 Kirsten ....................... 386/109

FOREIGN PATENT DOCUMENTS

JP    2001-16541    1/2001
JP    2002-112192    4/2002

* cited by examiner

*Primary Examiner*—Vikkram Bali
*Assistant Examiner*—Eueng-Nan Yeh
(74) *Attorney, Agent, or Firm*—Antonelli, Terry, Stout & Kraus, LLP.

(57) ABSTRACT

A picture-data compression system for compressing inputted multiple picture data includes a storage device that stores the multiple picture data; a selection controller that writes the multiple picture data into the storage device and reads the multiple picture data from the storage device; a pixel-number converter that converts the number of pixels of the picture data read from the storage device; and an inter-picture predictive coding unit that codes the picture data whose number of pixels is converted by the pixel-number converter by inter-picture predictive coding. The selection controller reads the picture data written to the storage device at a period of 1/n (positive integer) times the frame period or field period of the picture data. The pixel-number converter converts the number of pixels of the picture data read from the storage device to 1/m times (positive integer) the original.

11 Claims, 5 Drawing Sheets

MULTIPLE PICTURE-DATA COMPRESSION SYSTEM

BACKGROUND OF THE INVENTION

The present invention relates in general to a picture-data compression system for compressing picture data; and, more particularly, it relates to a system for compressing multiple picture data like that produced in a monitor camera system.

Various systems for compressing multiple picture data have been developed, including the following:

Specifically, JP-A-2001-16541 discloses an excellent method and apparatus for storing pictures, which method and apparatus are capable of providing higher compression than conventional picture storage units that use a compression method incorporating inter-frame prediction to achieve long-time picture recording, and it also discloses a method and apparatus for providing a picture signal that is suitable for compression means incorporating inter-frame prediction to increase the compression efficiency by temporarily storing picture signals, without correlation between frames which are not suitable for the compression means incorporating inter-frame prediction and by rearranging them.

SUMMARY OF THE INVENTION

The amount of picture data to be processed at a given time increases with an increase in the number of cameras, thereby placing a heavy load on compression processing.

Accordingly, it is an object of the present invention to reduce the load in compression processing of picture data taken by multiple cameras.

In order to achieve the above-stated object, the following picture-data compression system is provided.

According to a first aspect of the present invention, there is provided a picture-data compression system for compressing inputted multiple picture data. The compression system includes a storage device that stores the multiple inputted picture data, a selection controller that writes the multiple picture data into the storage device and reads the multiple picture data from the storage device, a pixel-number converter that converts the number of pixels of the picture data read from the storage device, and an inter-picture predictive coding unit that codes the picture data, whose number of pixels is converted by the pixel-number converter, by inter-picture predictive coding. The selection controller reads the picture data written to the storage device at a period of 1/n (positive integer) times the frame period or field period of the picture data. The pixel-number converter converts the number of pixels of the picture data read from the storage device to 1/m times (positive integer) the original.

Since the number of pixels of picture data is converted to 1/m (positive integer) times by the pixel-number converter, the load on the inter-picture predictive coding unit can be decreased. The selection controller reads the picture data written to the storage device at a period of 1/n (positive integer) times the frame period or field period of the picture data. Accordingly, when the inputted multiple picture data is taken by different cameras, the picture data of each camera can be coded without decreasing the frame rate.

According to a second aspect of the present invention, there is provided a picture-data compression system for compressing inputted multiple picture data. The compression system includes a pixel-number converter that converts the number of pixels of the multiple picture data taken by multiple cameras, a storage device that stores the multiple picture data whose number of pixels is converted by the pixel-number converter, a selection controller that writes multiple picture data into the storage device and reads multiple picture data from the storage device, and an inter-picture predictive coding unit that codes the picture data read by the selection controller by inter-picture predictive coding. The pixel-number converter converts the number of pixels of the picture data to 1/m times (positive integer) for each frame or field. The selection controller merges the m pieces of picture data converted by the pixel-number converter and writes the merged picture data into the storage device, and reads the merged picture data at the frame period or field period of the inputted multiple picture data.

Since the number of pixels of picture data is converted to 1/m (positive integer) times by the pixel-number converter, the load on the inter-picture predictive coding unit can be decreased. Accordingly, even when the inputted multiple picture data is taken by different cameras, the picture data of each camera can be coded without decreasing the frame rate.

According to the present invention, a picture-data compression system having improved usability can be provided.

DESCRIPTION OF THE PREFERRED EMBODIMENTS

First Embodiment

Figure 1:
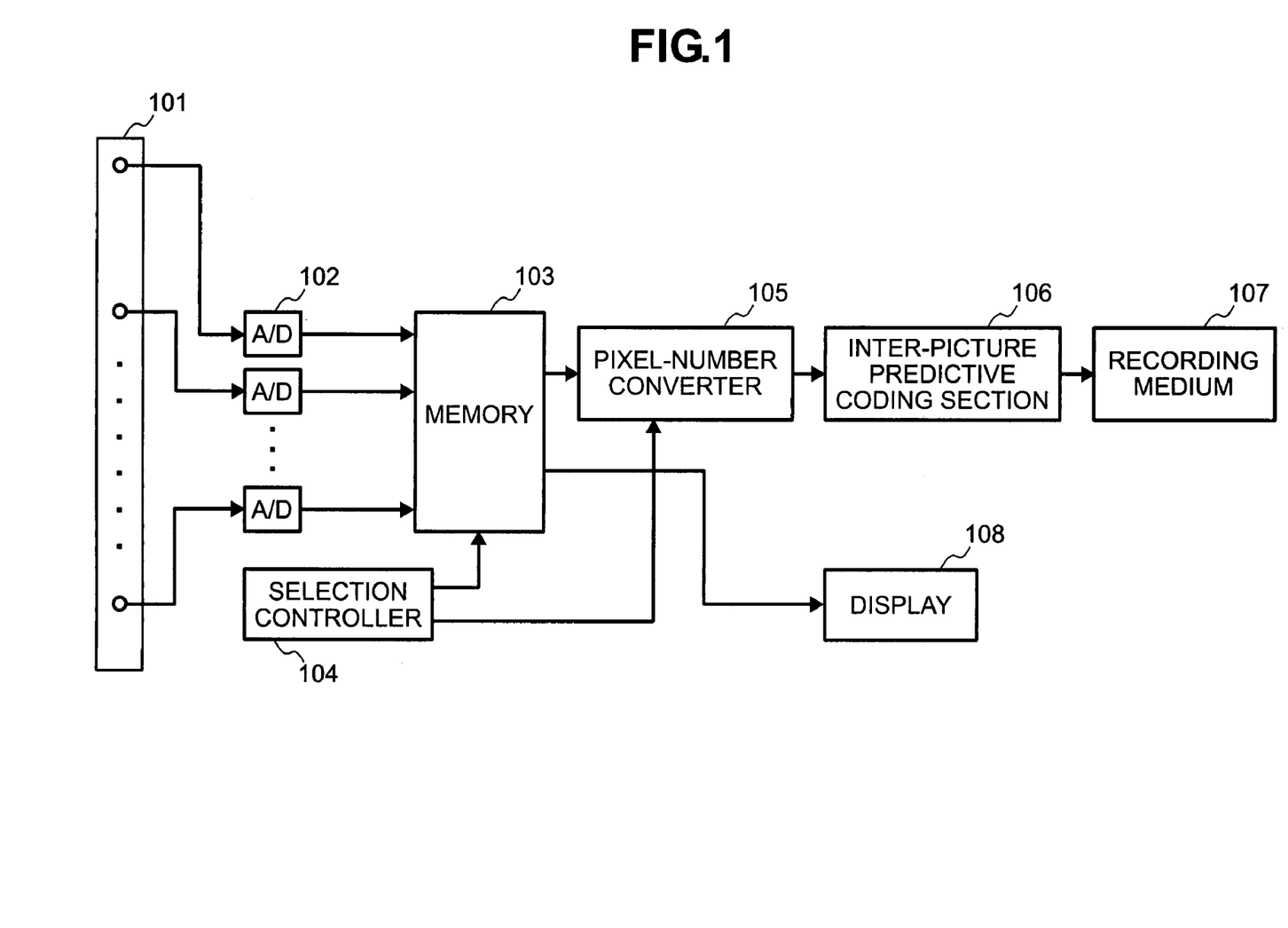
FIG. 1 is a block diagram of a picture-data compression system according to a first embodiment of the present invention.

FIG. 1 is a block diagram of a picture-data compression system according to a first embodiment of the present invention. Reference numeral 101 denotes an input unit that inputs n picture data. Numeral 102 denotes a plurality of A/D converters for converting each of the outputs of the input unit 101 to a digital picture signal. Numeral 103 denotes a memory including an FIFO memory. The memory 103 stores the respective frame pictures of multiple picture data. The frame pictures of the multiple picture data which have already been written to the memory 103 are switched in continuous identical picture data multiframes, where the multiple picture data is mixed and read as one-system picture data. Numeral 104 denotes a selection controller for controlling the designation of writing and reading areas of the memory 103 and the timing thereof. Numeral 105 denotes a pixel-number converter for converting a picture read from the memory 103 to 1/m times multiple pixels. The selection controller 104 controls the value m of the pixel-number converter 105. The continuous identical picture data multiframes read from the memory 103 and whose pixels are converted by the pixel-number converter 105 are each compressed by MPEG coding etc. by an inter-picture predictive coding section 106, and, the result is recorded in a recording medium 107. Numeral 108 denotes a display including a monitor. The display 108 displays other picture data read from the memory 103, which is different from the picture data that is compressed by the inter-picture predictive coding section 106, as selected by the selection controller 104.

Figure 2:
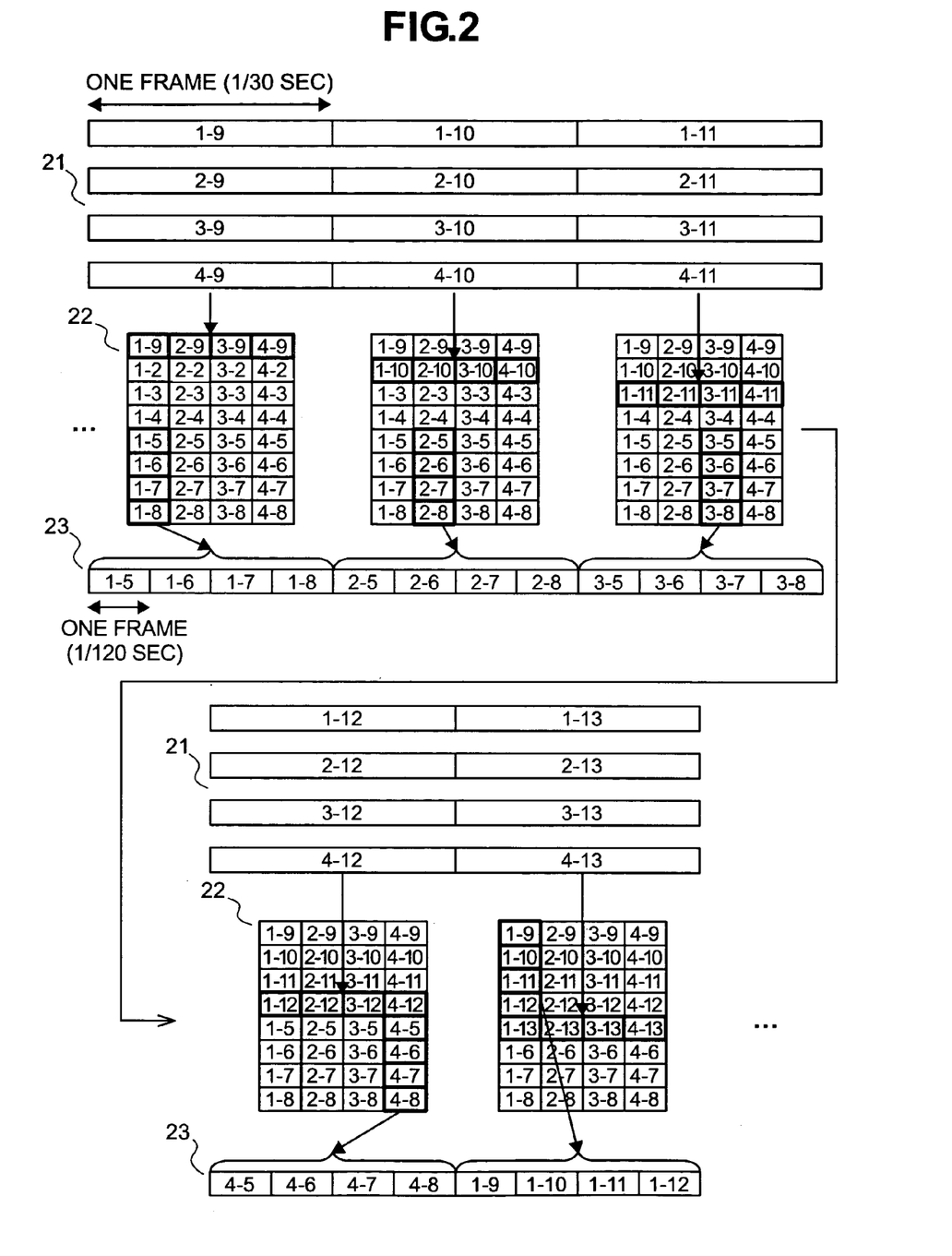
FIG. 2 is a diagram showing picture data and a memory recording state for the operation of writing and recording multiple picture data to/from a memory, according to the first embodiment of the present invention.

FIG. 2 is a diagram illustrating the operation of the selection controller 104 of the system of FIG. 1, showing the designation of storing and reading areas of multiple picture data in the memory 103 and the timing thereof.

Referring to FIG. 2, numeral 21 denotes four pieces of picture data to be stored in the memory 103, in which the time of one frame is ⅓₀ of a second. For a symbol k–1, such as 1-2, 1-3, 1-4 and so on, 2-2, 2-3, 2-4 and so on, 3-2, 3-3, 3-4- and so on, 4-2, 4-3, 4-4 and so on in the drawing, "k" (k=1, 2, 3, 4) indicates the four pieces of labeled picture data, and an appended "1" indicates a time-series numbered frame in each picture data, i.e., 1-1 indicates frame 1 of picture data 1. The example in the drawing shows a case in which picture data 1, picture data 2, picture data 3, and picture data 4 are stored in respective frames in the memory 103. Numeral 22 denotes the schematic time-series record state of the memory 103. Numeral 23 shows mixed picture data read in groups of four frames in units of picture data from the memory 103. In the memory record state 22, one rectangular frame is a picture-data storage region of one frame. A bold rectangular frame indicates regions to be read and written at that time. The arrow indicates a reading or writing operation. Numeral 23 denotes mixed picture data read from the memory 103 in groups of four frames in units of picture data in ¹⁄₁₂₀ of a second, that is, ¼ times the time for one frame writing. By controlling the reading and writing of the memory 103 using the selection controller 104, the input picture data can be rearranged.

Figure 3:
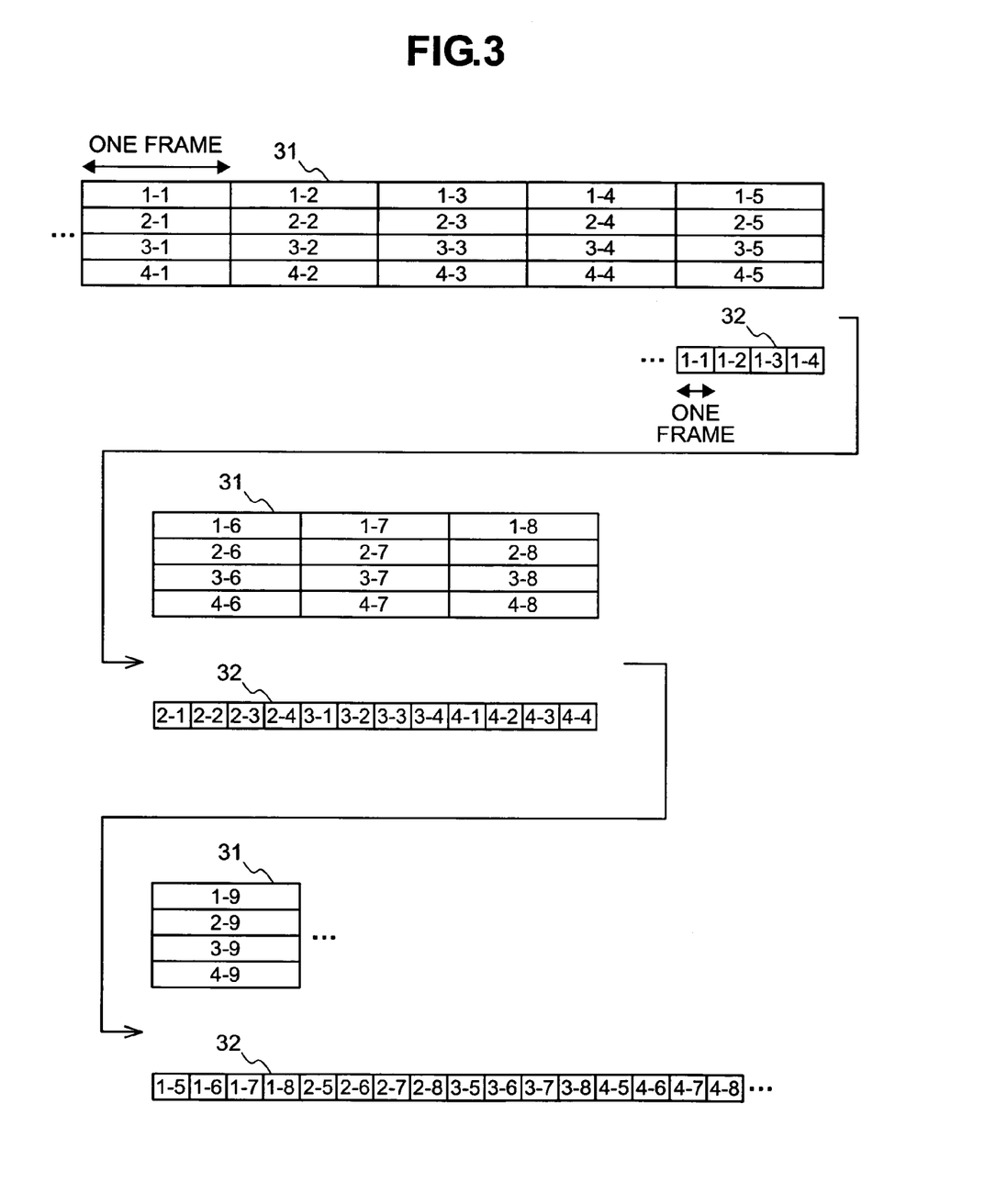
FIG. 3 is a diagram of picture data showing the input and output of multiple picture data according to the first embodiment of the present invention.

FIG. 3 is an explanatory diagram of multiple picture data inputted to the memory 103 and mixed picture data read from the memory 103 in the system of FIG. 1.

Referring to FIG. 3, numeral 31 denotes four pieces of input picture data written to the memory 103, showing only the frames labeled as 1-1 to 4-9.

Numeral 32 denotes mixed picture data read from the memory 103, showing only the frames labeled as 1-2 to 4-8. As shown in FIG. 3, when the selection controller 104 reads picture data of one frame from the memory 103 in a time that is ¼ times the time per one frame of data written to the memory 103 by the selection controller 104, four picture data can be read from the memory as mixed picture data at a rate of 30 frames per one second, which is equal to the frame rate of the individual input picture data. As described above, the selection controller 104 reads picture data of one frame from the memory 103 in a time that is 1/n times per one frame of data written to the memory 103 so as to obtain a recording frame rate equal to or close to the input frame rate to the memory 103.

Referring to FIGS. 2 and 3, multiple picture data is individually read from the memory 103 in units of multiple frames or multiple fields. This is for operating inter predictive coding method by using inter-frame difference at the inter-picture predictive coding section 106. If coding is possible by using single frame or single field by using other coding method, the inter-picture predictive coding section 106 does not need to read the multiple picture data collectively in units of multiple frames or multiple fields.

A method of controlling the values of n and m by use of the selection controller 104 will be described. The number of pixels of the mixed picture data read from the memory 103 is converted by the pixel-number converter 105 so that the number of pixels of the picture in one frame is decreased. The number of the pixels after conversion is determined depending on the rate of frames that can be compressed by the inter-picture predictive coding section 106 and the number of pixels of the picture. For example, assuming that the maximum compression capability of the inter-picture predictive coding section 106 is 30 pieces of pictures at 704 horizontal× 480 vertical pixels per second, in order to record four input picture data with a frame rate of 30 per second and with 704 horizontal×480 vertical pixels without decreasing the input frame rate, four picture data are read from the memory 103 at a frame rate of 120 per second by the selection controller 104, with the picture data being mixed for each identical picture data continuous frame, and the picture read from the memory 103 is converted to picture data of ¼ times the number of pixels, for example, of 352 horizontal×240 vertical pixels by the pixel-number converter 105 according to controlling the selection controller 104.

According to this embodiment, multiple picture data can be rearranged into identical picture data continuous frames by the selection controller 104, allowing inter-frame predictive coding by the inter-picture predictive coding section 106. Also, mixed picture data that is rearranged into identical picture data continuous frames is read from the memory 103 at a rate higher than the frame rate of the multiple input picture data according to control provided by the selection controller 104, and whose number of pixels is converted by the pixel-number converter 105 so as to match the coding capability of the inter-picture predictive coding section 106. Accordingly, each of the multiple picture data can be subjected to inter-frame predictive coding at a rate equal to or close to the frame rate of the multiple input picture data, depending on the number of pixels that the inter-picture predictive coding section 106 can code per unit time.

In this embodiment, inter-frame predictive coding is performed. Alternatively, inter-field predictive coding can be achieved by replacing all of the frames of the embodiment with fields.

The selection controller 104 may control the values of m and n depending on the data rate per one pixel of picture data to be outputted to the inter-picture predictive coding section 106, or the clock frequency. The clock frequency of input picture data, when the inter-picture predictive coding section 106 codes 30 pictures of 704 horizontal×480 vertical pixels per one second, amounts to 13.5 MHz. For example, when the inter-picture predictive coding section 106 is capable of coding input picture data having a clock frequency of 54 MHz, the selection controller 104 reads four picture data from the memory 103 at a frame rate of 120 per second, or at ¼ times (n=4) the time per one frame at which data is written to the selection controller 104, with the picture data being mixed for each identical picture data continuous frame, and it outputs picture data of 1 times (m=1) the pixels to the inter-picture predictive coding section 106 at a clock frequency of 54 MHz, which is four times 13.5 MHz. Thus, each of the four picture data of 704 horizontal×480 vertical pixels can be coded at a rate of 30 per second.

Second Embodiment

Figure 4:
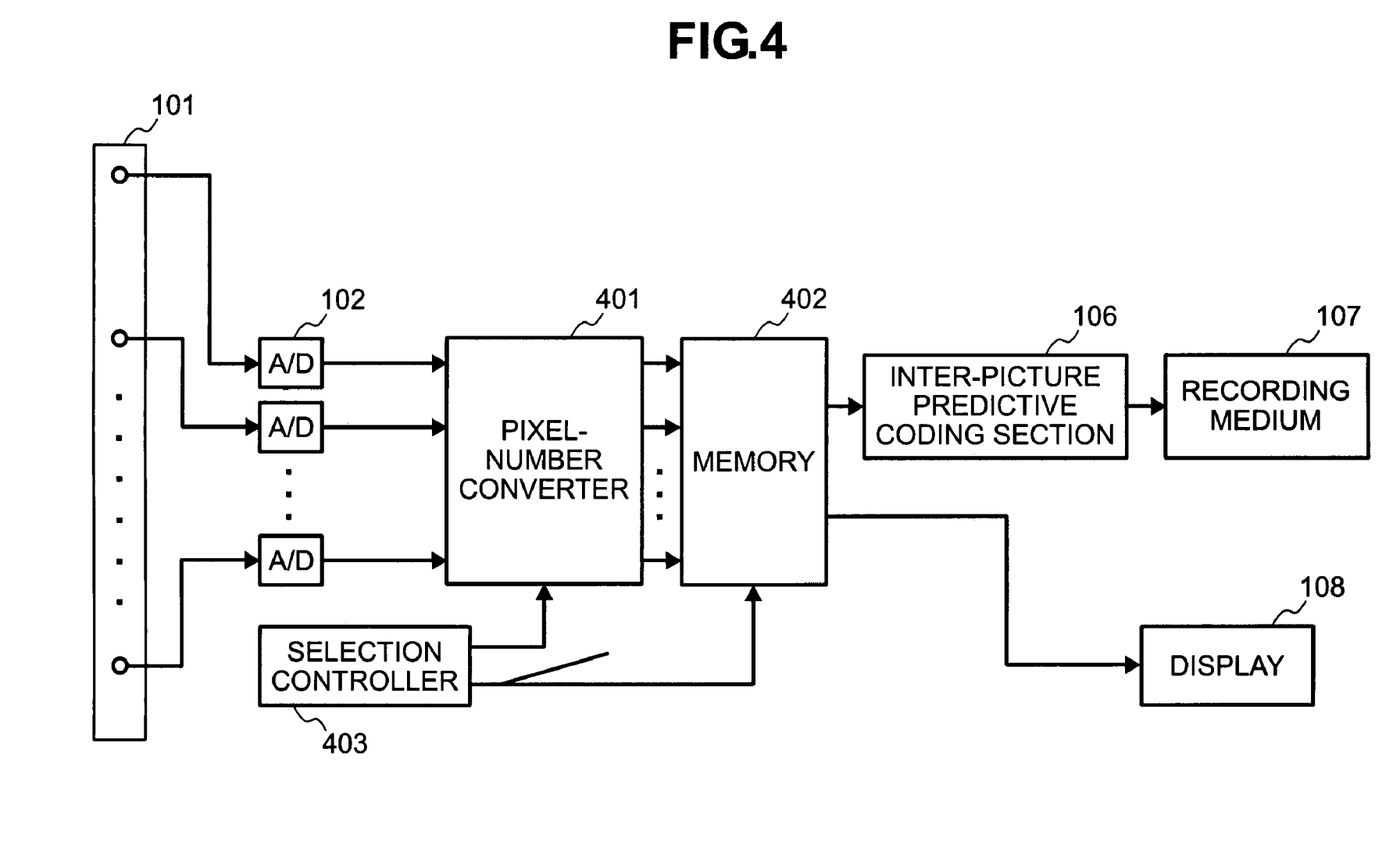
FIG. 4 is a block diagram of a picture-data compression system according to a second embodiment of the present invention.

FIG. 4 is a block diagram of a picture-data compression system according to a second embodiment of the present invention. Parts corresponding to FIG. 1 are given the same reference numerals, and a repeated description thereof will be omitted. Numeral 401 denotes a pixel-number converter for converting the number of pixels of each of multiple picture data to 1/m times. Numeral 402 denotes a memory including an FIFO memory. The memory 402 stores the respective frame pictures of n pieces of picture data. The frame pictures of the n pieces of picture data, which have already been written to the memory 402, are switched in continuous identical picture data multiframes, where the multiple picture data is mixed and read as one-system picture data. Numeral 403 denotes a selection controller for controlling the value m of pixel-number conversion and for controlling the designation of writing and reading areas of the memory 402 and the timing thereof. The display 108 displays other picture data read from the memory 402, which is different from the picture data compressed by the inter-picture predictive coding section 106, as selected by the selection controller 403.

Figure 5:
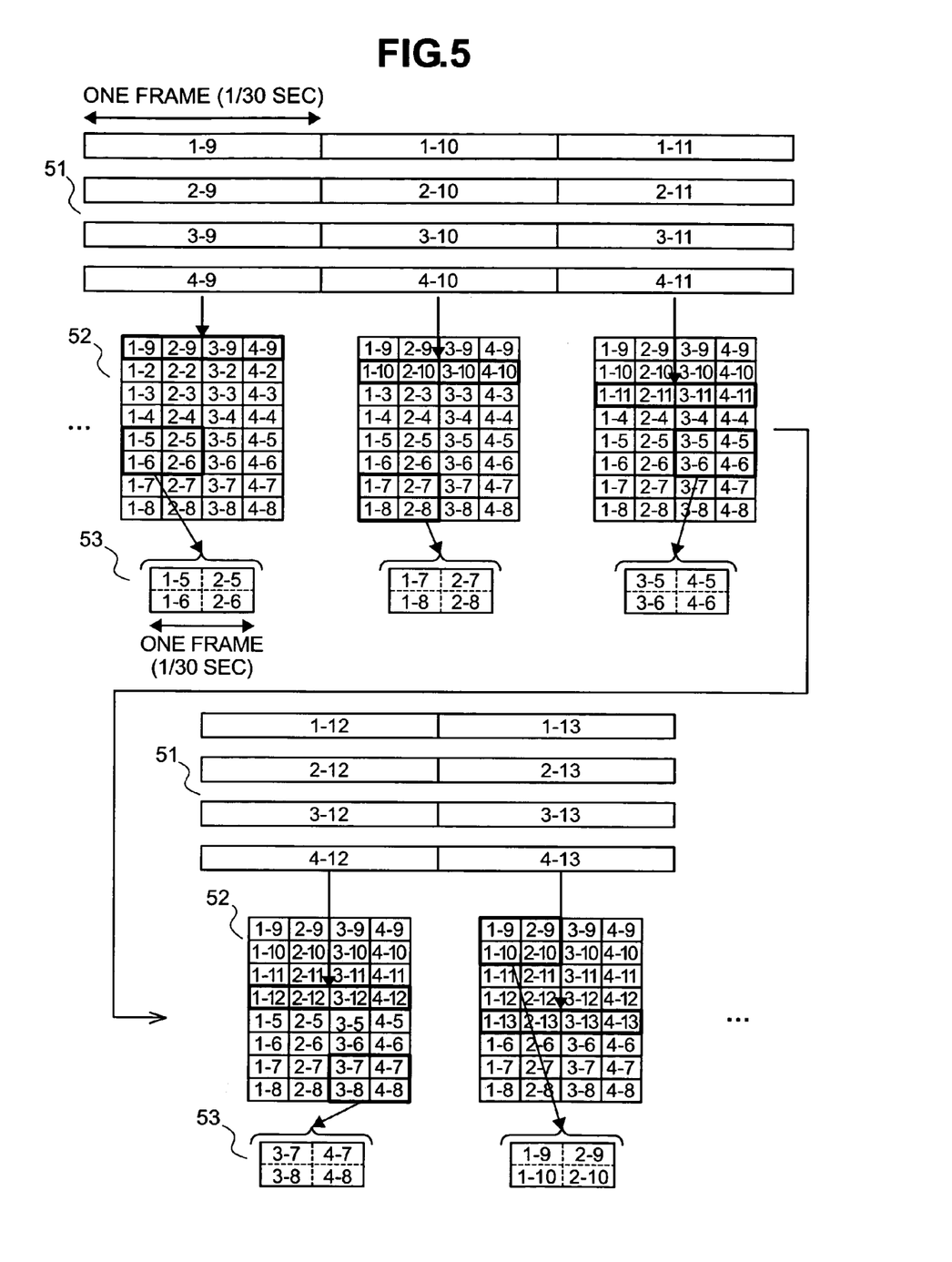
FIG. 5 is a diagram showing picture data and a memory recording state for the operation of writing and recording multiple picture data to/from a memory, according to the second embodiment of the present invention.

FIG. 5 is a diagram illustrating the operation of the selection controller 403 in the system of FIG. 4, showing the designation of storing and reading areas for multiple picture data in the memory 402 and the timing thereof.

Referring to FIG. 5, numeral 51 denotes four pieces of picture data of 704 horizontal×480 vertical pixels in which the time of one frame is 1/30 of a second. For symbol k–1, such as 1-2, 1-3, 1-4 and soon, 2-2, 2-3, 2-4 and so on 3-2, 3-3, 3-4 and so on, 4-2, 4-3, 4-4 and so on in the drawing, "k" (k=1, 2, 3, 4) indicates four labeled picture data, and an appended "1" indicates a time-series numbered frame in each picture data, i.e., 1-1 indicates frame 1 of picture data 1. The example in the drawing shows a case in which picture data 1, picture data 2, picture data 3, and picture data 4 are stored in respective frames in the memory 402. The number of pixels of the picture data designated by numeral 51 is converted to ¼ times the number of pixels of 352 horizontal×240 vertical pixels by the pixel-number converter 401, and it is recorded in the memory 402. Numeral 52 denotes the schematic time-series record state of the memory 402. Numeral 53 shows mixed picture data read in groups of four frames in units of composite picture data from memory 402. In the memory record state 52, one rectangular frame is a picture-data storage region of one frame at the time it is inputted to the picture-data compression system. A bold rectangular frame indicates regions to be read and written at that time. The arrow indicates a reading or writing operation. Numeral 53 denotes mixed picture data read from the memory 402 in units of composite picture data in the time equal to that for one frame in writing. By controlling the reading and writing of the memory 402 using selection controller 403, as described above, the input picture data can be merged together and the composite picture data can be rearranged. The broken line in the rectangular frame indicates the state of the composite picture data in one frame. In this way, the selection controller 403 controls the pixel-number converter 401 to convert the number of pixels to ¼ times, writes four composite picture data into the memory 402, and reads the composite picture data of one frame from the memory 402 in the time per one frame of the input picture data, so that four picture data can be read from the memory 402 as mixed picture data at a frame rate of 30 per second, which is equal to the frame rate of individual input picture data. As described above, the selection controller 403 converts the number of pixels so as to obtain a frame rate equal to or close to the frame rate of multiple input picture data, writes the merged multiple picture data into the memory 402, and reads the composite picture data of one frame from the memory 402 in a time that is shorter than the time for one frame of the input picture data. As shown by the relationship of the mixed picture data 53 in FIG. 5, the correlated parts in one frame are in the same position (picture data 1 and picture data 3 are on the left, while picture data 2 and picture data 4 are on the right), the data becomes suitable for coding by the inter-picture predictive coding section 106. Alternatively, at the time of reading, the arrangement of input picture data in one frame may be controlled so that picture data 1 is on the upper left, picture data 2 is on the upper right, picture data 3 is on the lower left, and picture data 4 is on the lower right, so as to be suitable for coding by the inter-picture predictive coding section 106, in contrast to the writing and reading of the memory 402 shown in FIG. 5

Referring to FIG. 5, multiple picture data is read from the memory 402 in units of multiple frames or multiple fields. Even if multiple picture data is not collectively inputted in units of multiple frames or multiple fields, the selection controller 403 may not read the multiple picture data collectively in units of multiple frames or multiple fields, if inter-frame predictive coding is possible by the inter-picture predictive coding section 106.

A method of controlling the value of m by use of the selection controller 403 will be described. The number of pixels of multiple picture data is converted by the pixel-number converter 401 so that the number of pixels of the picture in one frame is decreased. The number of the pixels after conversion is controlled by the selection controller 403 depending on the rate of frames that can be compressed by the inter-picture predictive coding section 106 and the number of pixels of the picture. For example, assuming that the maximum compression capability of the inter-picture predictive coding section 106 is 30 pieces of pictures of 704 horizontal× 480 vertical pixels per second, in order to record four input picture data at a frame rate of 30 per second and having 704 horizontal×480 vertical pixels without decreasing the input frame rate, the four picture data is converted to a picture of ¼ times the pixels, or a picture of 352 horizontal×240 vertical pixels using the pixel number converter 401, and the four picture data are written into the memory 402 by the selection controller 403 so as to be merged to a picture of 704 horizontal×480 vertical pixels, and then the composite picture of the four picture data is read from the memory 402 at a frame rate of 30 per second by the selection controller 403.

According to this embodiment, multiple picture data are rearranged into identical mixed picture data continuous frames by the selection controller 403, allowing inter-frame predictive coding by the inter-picture predictive coding section 106. Also, picture data, whose number of pixels is converted by the pixel-number converter 401 so as to match the coding capability of the inter-picture predictive coding section 106, is merged and written to the memory 402 according to control by the selection controller 403, and mixed picture data that is rearranged into identical merged picture data of continuous frames is read from the memory 402 at a rate equal to or higher than the frame rate of the multiple input picture data. Accordingly, each of the multiple picture data can be subjected to inter-frame predictive coding at a rate equal to or close to the frame rate of the multiple input picture data depending on the number of pixels that the inter-picture predictive coding section 106 can code per unit time.

In this embodiment, the number of horizontal pixels and the number of vertical pixels are converted at a equal rate. Alternatively, the rate of conversion can be different; for example, the number of horizontal pixels need not be changed, and only the number of vertical pixels is changed.

In this embodiment, inter-frame predictive coding is performed. Alternatively, inter-field predictive coding can be achieved by replacing all of the frames of the embodiment with fields.

According to the foregoing embodiments, a picture-data compression system is provided which is capable of recording pictures taken by multiple cameras at a high frame rate without increasing the number of components.

What is claimed is:

1. A picture-data compression system for compressing inputted multiple picture data, comprising:
   a storage device that stores the multiple picture data;
   a selection controller that writes the multiple picture data into the storage device and reads the multiple picture data from the storage device;
   a pixel-number converter that converts the number of pixels of the picture data read from the storage device; and
   an inter-picture predictive coding unit that codes the picture data whose number of pixels is converted by the pixel-number converter by inter-picture predictive coding, wherein
   the selection controller reads the picture data written to the storage device at a period of 1/n (positive integer) times the frame period or field period of the picture data;
   the pixel-number converter converts the number of pixels of the picture data read from the storage device to 1/m times (positive integer) the original; and
   the selection controller controls the values n and m depending on the number of pixels that can be processed by the inter-picture predictive coding unit in a unit time.

2. The picture-data compression system according to claim 1 wherein
   the selection controller reads the multiple picture data from the storage device in units of multiple frames or multiple fields.

3. The picture-data compression system according to claim 1 wherein
   the selection controller controls the period of reading picture data from the storage device to be a frame period or field period of 30 per second, 60 per second, or 120 per second.

4. A picture-data compression system for compressing inputted multiple picture data, comprising:
   a storage device that stores the multiple picture data;
   a selection controller that writes the multiple picture data into the storage device and reads the multiple picture data from the storage device;
   a pixel-number converter that converts the number of pixels of the picture data read from the storage device; and
   an inter-picture predictive coding unit that codes the picture data whose number of pixels is converted by the pixel-number converter by inter-picture predictive coding, wherein
   the selection controller reads the picture data written to the storage device at a period of 1/n (positive integer) times the frame period or field period of the picture data;
   the pixel-number converter converts the number of pixels of the picture data read from the storage device to 1/m times (positive integer) the original; and
   a display unit that displays the multiple picture data in real time, wherein
   the selection controller reads picture data from the storage device, the picture data being different from the picture data coded by the inter-picture predictive coding unit, and outputs the picture data to the display unit.

5. A picture-data compression system for compressing inputted multiple picture data, comprising:
   a storage device that stores the multiple picture data;
   a selection controller that writes the multiple picture data into the storage device and reads the multiple picture data from the storage device;
   a pixel-number converter that converts the number of pixels of the picture data read from the storage device; and
   an inter-picture predictive coding unit that codes the picture data whose number of pixels is converted by the pixel-number converter by inter-picture predictive coding, wherein
   the selection controller reads the picture data written to the storage device at a period of 1/n (positive integer) times the frame period or field period of the picture data;
   the pixel-number converter converts the number of pixels of the picture data read from the storage device to 1/m times (positive integer) the original;
   the selection controller reads the multiple picture data from the storage device in units of multiple frames or multiple fields; and
   the selection controller controls the values n and m depending on the number of pixels that can be processed by the inter-picture predictive coding unit in a unit time.

6. The picture-data compression system according to claim 5 wherein
   the selection controller controls the period of reading picture data from the storage device to be a frame period or field period of 30 per second, 60 per second, or 120 per second.

7. A picture-data compression system for compressing inputted multiple picture data, comprising:
   a storage device that stores the multiple picture data;
   a selection controller that writes the multiple picture data into the storage device and reads the multiple picture data from the storage device;
   a pixel-number converter that converts the number of pixels of the picture data read from the storage device; and
   an inter-picture predictive coding unit that codes the picture data whose number of pixels is converted by the pixel-number converter by inter-picture predictive coding, wherein
   the selection controller reads the picture data written to the storage device at a period of 1/n (positive integer) times the frame period or field period of the picture data;
   the pixel-number converter converts the number of pixels of the picture data read from the storage device to 1/m times (positive integer) the original;
   the selection controller reads the multiple picture data from the storage device in units of multiple frames or multiple fields; and
   a display unit that displays the multiple picture data in real time, wherein
   the selection controller reads picture data from the storage device, the picture data being different from the picture data coded by the inter-picture predictive coding unit, and outputs the picture data to the display unit.

8. A picture-data compression system for compressing inputted multiple picture data, comprising:
   a pixel-number converter that converts the number of pixels of the multiple picture data;
   a storage device that stores the multiple picture data whose number of pixels is converted by the pixel-number converter;
   a selection controller that writes multiple picture data into the storage device and reads multiple picture data from the storage device; and
   an inter-picture predictive coding unit that codes the picture data read by the selection controller by inter-picture predictive coding, wherein
   the pixel-number converter converts the number of pixels of the picture data to 1/m times (positive integer) the original for each frame or field;
   the selection controller merges the m pieces of picture data converted by the pixel-number converter and writes the merged picture data into the storage device, and reads the merged picture data at the frame period or field period of the inputted multiple picture data; and the selection controller controls the value m depending on the number of pixels that can be processed by the inter-picture predictive coding unit in a unit time.

9. The picture-data compression system according to claim 8 wherein the selection controller reads the multiple picture data from the storage device in units of multiple frames or multiple fields.

10. The picture-data compression system according to claim 8 wherein the selection controller controls the period of reading picture data from the storage device to be a frame period or field period of 30 per second, 60 per second, or 120 per second.

11. A picture-data compression system for compressing inputted multiple picture data, comprising:

a pixel-number converter that converts the number of pixels of the multiple picture data;

a storage device that stores the multiple picture data whose number of pixels is converted by the pixel-number converter;

a selection controller that writes multiple picture data into the storage device and reads multiple picture data from the storage device; and an inter-picture predictive coding unit that codes the picture data read by the selection controller by inter-picture predictive coding, wherein the pixel-number converter converts the number of pixels of the picture data to 1/m times (positive integer) the original for each frame or field;

the selection controller merges the m pieces of picture data converted by the pixel-number converter and writes the merged picture data into the storage device, and reads the merged picture data at the frame period or field period of the inputted multiple picture data; and a display unit that displays the multiple picture data in real time, wherein the selection controller reads picture data from the storage device, the picture data being different from the picture data coded by the inter-picture predictive coding unit, and outputs the picture data to the display unit.

* * * * *